United States Patent [19]

Barton

[11] 4,072,186
[45] Feb. 7, 1978

[54] DUAL FUNCTION HEATER CORE

[75] Inventor: David W. Barton, Birmingham, Mich.

[73] Assignee: Ford Motor Company, Dearborn, Mich.

[21] Appl. No.: 674,011

[22] Filed: Apr. 5, 1976

[51] Int. Cl.$^2$ .................. F01B 29/10; F02G 1/04; B60H 3/00; B61D 27/00

[52] U.S. Cl. .................. 165/43; 60/524; 165/51; 237/12.3 R

[58] Field of Search .................. 237/12.3 B, 12.3 R; 60/517, 524; 165/42, 43, 51

[56] References Cited

U.S. PATENT DOCUMENTS

| | | | |
|---|---|---|---|
| 3,583,630 | 6/1971 | Wilfert et al. | 237/12.3 B |
| 3,696,730 | 10/1972 | Masuda et al. | 237/12.3 B |
| 3,823,568 | 7/1974 | Bijasiewicz et al. | 165/42 X |
| 3,834,451 | 9/1974 | Kozinski | 165/43 X |

FOREIGN PATENT DOCUMENTS

492,443   9/1938   United Kingdom ............ 237/12.3 B

*Primary Examiner*—Charles J. Myhre
*Assistant Examiner*—Sheldon Richter
*Attorney, Agent, or Firm*—Joseph W. Malleck; Olin B. Johnson

[57] ABSTRACT

An integrated system for engine heat extraction and comfort air conditioning in an automotive vehicle powered by a Stirling engine, the system being used (a) as a part of the heat rejecting means for the Stirling engine located in a compartment outside of the passenger compartment, and (b) for conditioning air within the passenger compartment. The heat rejecting means of the Stirling engine is effective to cool a selected zone of an enclosed working fluid circuit of the engine; the heat rejecting means is divided into two portions, one normally being diposed to reject heat to ambient air conditions and another disposed to selectively impart rejected heat either to air flow for conditioning air for said passenger compartment or to air flow to be aborted to ambient air conditions. The embodiment as disclosed further includes evaporation or heat absorption means and controls therefore to blend dehumidified cooled air with the air warmed by said heat rejection portion to render a total air conditioning system for the passenger compartment which relies in part upon the heat rejection means being continuously employed as an element of the Stirling engine. In another embodiment, the air conditioning system is arranged with appropriate controls to recirculate cool, dehumidified air to the heat rejection means for a reheating cycle before entering the passenger compartment; an ambient dump control is again employed so that the heat rejection means may be maintained in constant operation.

3 Claims, 3 Drawing Figures

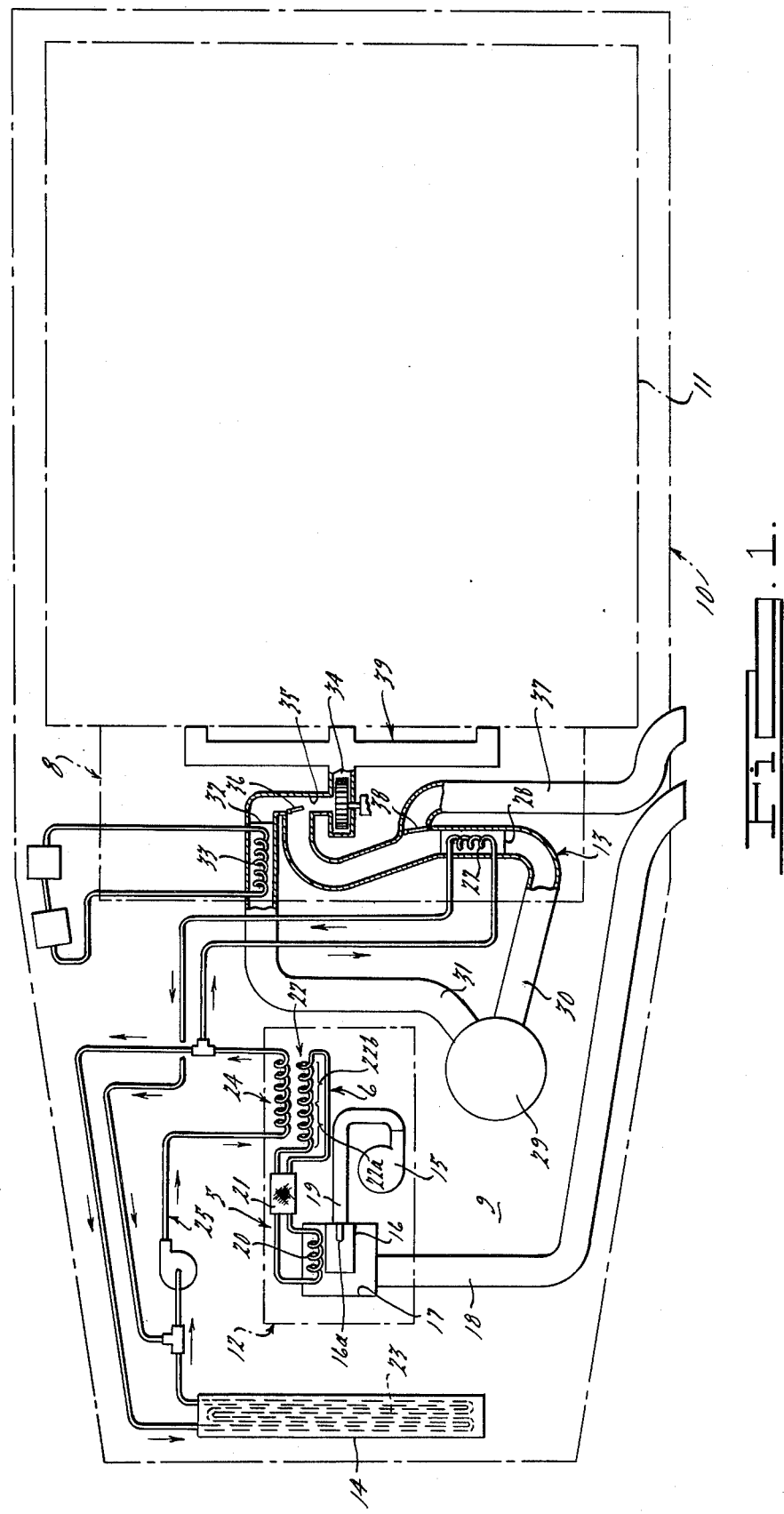

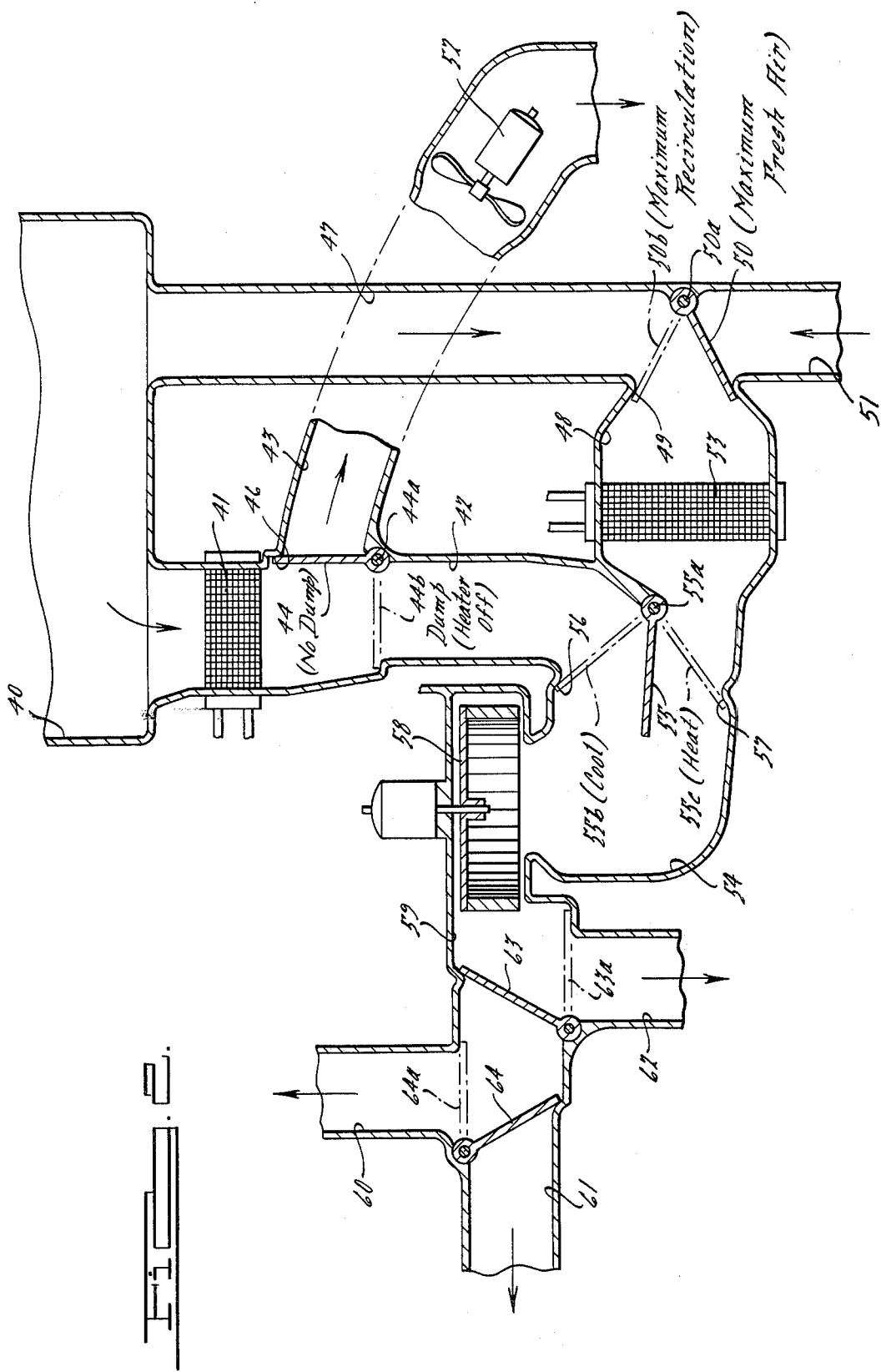

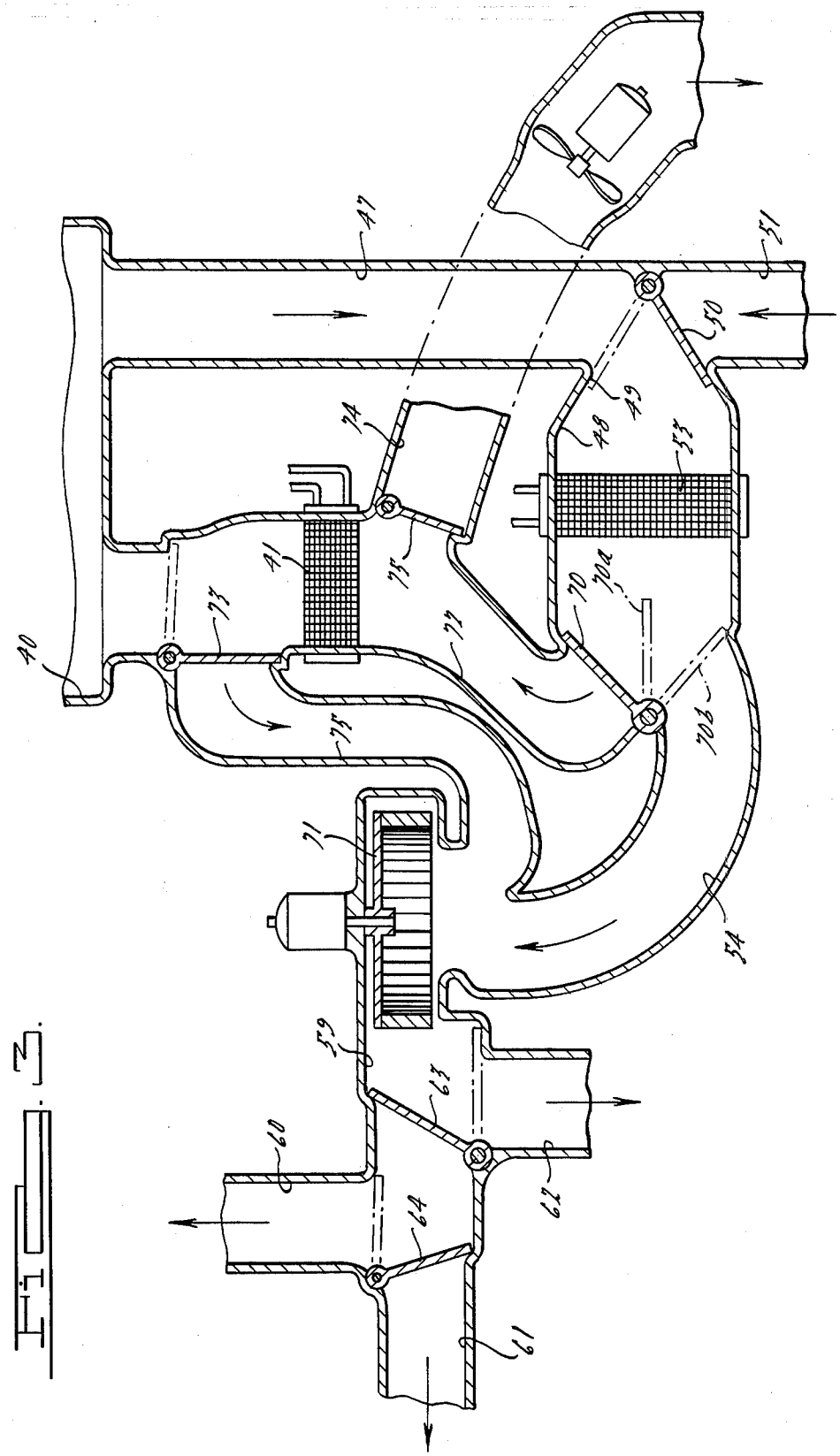

DUAL FUNCTION HEATER CORE

BACKGROUND OF THE INVENTION

Among the many problems confronted upon application of the Stirling engine to motor vehicle useage, two are of particular concern because they effect overall vehicle design. Problem (1) concerns the kind and type of equipment to be employed for alleviating the engine of its excess heat; and problem (2) is what equipment shall be used to heat the passenger compartment. In a Stirling engine, the engine cooling water must be regulated to a lower temperature than that in today's internal combustion engine; that is, the lowest temperature to which the cooling water is cooled by radiation is designed to be much lower. This will adversely affect the passenger heating system which depends on engine waste heat; the radiator or heater core employed for the passenger compartment will be too small to facilitate proper heating of the vehicle compartment in winter. In addition, the Stirling engine rejects more heat to the atmosphere and, this fact, coupled with the lower cooling water temperature, causes the demand upon the radiator and fan to become more severe especially in the summer where a greater volume of heat must be rejected to atmosphere.

Tomorrow's automobile must make the most efficient use of every pound it transports. Thus any solution to the above vehicle design problems must properly accommodate the heating of the passenger compartment and the cooling of the Stirling engine, and must take into consideration that weight must be incorporated only at a very minimum level. This is a direct result of diminishing fuel supplies and the emission sensitivity of automobile design. Unnecessary weight can be ill-afforded from either the performance or economy point of view.

The typical automobile, produced today, has a passenger compartment heater core in the climate control system which is utilized only about 50% of the time that the vehicle is driven, assuming a typical northern climate. If the radiator water is to be maintained cooler in a Stirling engine application, then the heater core will have to be increased in size (with correspondingly added weight) to achieve a proper heat transfer for the vehicle passenger compartment. Even if the initial cost of this additional apparatus is neglected, the added weight is unfortunate when viewed from the standpoint that it is 50% utilized. There is a similar or companion increase in size and weight required for the radiator to meet the peak heat rejection conditions for the Stirling engine prevailing in summer in a typical northern climate. Again this added weight can be considered a penalty since the additional weight is utilized only about 50% of the time of the functioning unit. If the heater core increase in size can be employed in the winter for heating the passengers and again in summer to augment the radiator during peak loads, then the radiator may be maintained at a minimum weight and size.

SUMMARY OF THE INVENTION

A primary object of this invention is to provide an integrated air conditioning system for a passenger compartment of a vehicle powered by a Stirling engine, the heat rejection means of the engine having (a) a portion thereof employed to selectively reject heat to the passenger compartment, and (b) functioning continuously throughout all vehicle operations to serve the needs of the engine and by way of controls to serve the needs of the vehicle compartment.

Another object of this invention is to provide an air conditioning system for the passenger compartment of a Stirling powered vehicle, the system employing control means effective to communicate an air flow system passage with said compartment, the air in said passage being conditioned by one portion of the heat rejection means of the Stirling engine, the control means also being effective to dump air in said passage which has been conditioned by said one engine portion to ambient conditions.

Specific features pursuant to the above objects comprise (a) the separation of the heat rejection means of the Stirling engine into two portions, one portion being located in the air conditioning system for the passenger compartment, (b) employment of air control means which continuously deploys at least one portion of the Stirling engine heat rejection means to either heat air delivered to the vehicle compartment or to heat air that is dumped to ambient conditions by diversion from the passenger compartment.

SUMMARY OF THE DRAWINGS

FIG. 1 is a schematic layout of an automotive vehicle employing a Stirling engine; an integrated system is employed to service both the heat extraction needs of said engine and the comfort air conditioning needs of the passenger compartment;

FIG. 2 is an enlarged schematic flow system forming part of the integrated system of FIG. 1, showing a part of the heat rejection means deployed as a heat extraction element in the air conditioning subsystem; and FIG. 3 is a view similar to that of FIG. 2 illustrating an alternative embodiment.

DETAILED DESCRIPTION

Turning first to FIG. 1, there is shown a general layout for the basic elements of the system of this invention. An automotive vehicle 10 containing a passenger compartment 11 has a forward zone 9 containing a Stirling engine 12; a unit 8 contains an air conditioning system integrated with the heat extraction system 25 to serve both the engine 12 and the passenger compartment 11. The engine 12 is particularly comprised of a burner unit 16 supplied with an adequate mixture of a combustible fuel via nozzle 16a and an air supply from passage 19 connecting with blower 15. Combusted gases are exhausted from the heating chamber 17 through a passage 18 which leads to ambient conditions.

The Stirling engine has a closed working fluid circuit 5 comprised of heat absorbing tubes 20 effective to receive heat generated by burner unit 16; the working fluid conveys the hot fluid through a regenerator 21 into a cooling zone 6 having heat rejecting tubes 22; portion 22a of the tubes is associated with heat exchange or cooling tubes 24 which connect via circuit passages 3 and 4 directly with radiator 14 and by passages 1 and 2 (in parallel circuit with the passages 3 and 4) to heat rejecting tubes 27 for heater core 28.

The air conditioning system 13 is particularly comprised of said heat rejection tubes 27, serving as said compartment heater 28, disposed in one leg 30 of an air intake system for the air conditioning system. The other leg 31 of said air conditioning intake is disposed, as is leg 30, to receive air from intake means 29; legs 30 and 31 separately deliver air for independent heating or cooling. In leg 31 is disposed a passenger compartment evaporator 32 for cooling the intake air and dehumidifying same. The passenger compartment evaporator is associated with heat absorbing tubes 33 which in turn are associated with the conventional vehicle freon system having a compressor and condenser. The air conditioned by said passenger compartment heater 28 or compartment evaporator 32 is delivered to a common passage 35 leading to a blower 34 for delivering air to one or all of three inlets to the passenger compartment, said inlets being designated generally by passage system 39. A blend control means 36 is employed to selectively deliver either dehumidified cooled air or heated air or a combination thereof.

A dump control means 38 is employed to permit the heat rejection means 28 to be deployed continuously during operation of the Stirling engine and regardless of the heating needs of the passenger compartment. To this end, the dump door is controlled to close off communication through passage 37 when heating is required, such as during winter operating conditions. During other times, the dump door is positioned to close off communication to the blower 34 leading to the passenger compartment thereby causing the air, which has traversed the heat rejecting means (compartment heater 28) to be dumped to ambient air conditions through passage 37.

Turning now to FIG. 2, an enlarged schematic diagram is presented of certain controls within the air conditioning system 13. The arrangement here shows that the size of heater core 41 can be increased if it is used in the winter for heating the passengers and again in the summer to augment the function of radiator 14 during peak loads; the radiator 14 accordingly need not be quite so large. Both the normal radiator 14 for the Stirling engine and the additional radiator (employed as the passenger compartment heater 41) will be more fully utilized and more nearly approach an efficient solution.

The arrangement of FIG. 2 accomplishes this dual-function. An air plenum 40 supplies fresh air to two legs of an induction system, one leg 42 has disposed therein a portion of the heat rejection means of the Stirling engine, here identified as a heater core 41 for heating the passenger compartment. The other leg 47 is deployed to introduce fresh air to an air conditioning evaporator core 53 as well as receive additional air recirculated from inside the passenger compartment through passage 51, the latter communicating with passage 48.

Air conditioned by heater core 41 is normally permitted to flow through passage 42 into a passage 54 communicating with the blower 58, the latter serving to force air into one of three passenger compartment outlets (passage 60 leading to the defrost nozzles, passage 61 leading to the air conditioning outlet located at a mid height of the compartment, and passage 62 leading to the floor heating outlets. To accomplish this, a valve control 44 is employed which pivots about an axis 44a. In the full line position as shown in FIG. 2, the valve door of means 44 is positioned against an offset 46 at the mouth of passage 43 thereby closing off such dump passage 43 leading to exhaust. Full air flow is permitted to pass into passage 54 by the position of blend door 55 when in a lower dotted outline position 55a; partial air flow is permitted when the door 55 is in an intermediate position such as that shown in full line in FIG. 2. The blend door 55 is mechanically pivoted about an axis 55a (by conventional means not shown) so that it may assume either one of the three positions (55, 55c, 55b) shown in FIG. 2.

When heat is no longer required in the passenger compartment, dump door of means 44 is moved to the dotted outline position closing off communication through passage 42 and assuring that all air will be passed through the dump passage 43. To facilitate a higher flow of air through the dump passage, because of certain ambient conditions, a dump fan 52 may be employed to provide a greater positive forced condition. The dump door or directional valve 44 can be automatically controlled by a conventional water temperature operated switch (not shown) to assume any position between offsets 45 and 46.

The cooling aspect of the conditioning system is provided by the evaporator core 53 disposed in a passage 48 leading from the juncture of passages 51 and 47. The degree of recirculated air or fresh inlet air which is fed to passage 48 is determined by a recirculation door 50 mechanically pivoted about an axis 50a; such door is controlled by suitable thermal temperature sensitive means (not shown). The air conditioned by the evaporator core 53 is permitted to pass through the blend door 55 when it is in one of the positions remote from step 57. It is possible also to shut off air flowing through the passage 48 by movement of the blend door to its lower position against stop 57. In this latter position, the air is no longer allowed to pass through the evaporator core and is simply not conditioned by such element. The blend door 55 functions to regulate the amount of heat that is admitted to the passenger compartment. If a blend of dehumidified air plus warmed air is desired, the blend door is positioned at some midpoint position with the air conditioning door selected to be either in the fresh position (solid line) or maximum recirculation 50b (broken line). The dump 44 (during any position of door 55) can be at any position.

During summer, requiring cooling of the passenger compartment, the dump door 44 is moved to the heater off or dump position (broken line) against stop 45 whenever maximum cooling is selected for air conditioning or when the radiator water temperature reaches a first predetermined top value. Ram air is passed through the heater core 41, thus cooling the water in the tubes of the core 41; the air is dumped below the vehicle. Should the top water temperature reach another predetermined level, a temperature sensitive switch would turn on the dump fan 52 to increase dump air flow and thereby cooling of water in the tubes of core 41; air conditioning of the passenger compartment is uneffected.

Turning now to FIG. 3, there is illustrated an alternative embodiment which has the purpose of permitting cooled air to be reheated for special balancing of air humidity and to maximize the use of heater core 41 during mild conditions. To this end, a blend door 70 is employed to direct either cooled air to the blower 71 or to direct the cooled air back up through a passage 72 to the heater core 41; an additional control door 73 is employed to direct intake air through the heater core to dump passage 74 or direct cooled air reheated by core 41 to passage 75. The combination of directional doors 73, 50 and 70 permits only cooled air to be heated and enter the passenger compartment. Heated air only is always dumped to atmosphere through passage 74. Cooled air redirected through the heated core facilitates greater use of the heater core as a radiator in certain climates. An enhanced degree of heat rejection is obtained over that where air passes only through the heated core to enter the passenger compartment or be dumped to ambient conditions.

I claim:

1. In an automotive vehicle having a passenger compartment and a Stirling engine outside said compartment, said engine having a closed working fluid circuit, an integrated heat transfer system for both said Stirling engine and compartment, comprising:
   (a) an air flow system having a passage in which air is conditioned and conducted to said compartment,
   (b) heat rejecting means for said Stirling engine effective to cool a selective zone of said closed working fluid circuit, one portion of said means being disposed to continuously impart rejected heat to the air flowing in said passage, and another portion being disposed to impart rejected heat to ambient air conditions, and
   (c) control means effective to either communicate the air flow in said passage conditioned by said one portion with said compartment or dump the air in said passage conditioned by said one portion to ambient conditions.

2. An air conditioning system as in claim 1, which further comprises heat absorption means for removing heat from the air in said passage not conditioned by said one portion, and second control means effective to communicate air subjected to said heat absorption means with said compartment while said air subjected to said one portion is dumped to ambient conditions.

3. An air conditioning system as in claim 2, in which a second control means is employed to circulate air subjected to said heat absorption means to said passenger compartment for reheating purposes, the control being effective to circulate the air cooled by said heat absorption means to the heat rejecting means so that said heat rejecting means may be more continuously employed to reject a greater amount of heat during vehicle operation.

* * * * *